US007279872B2

(12) United States Patent
Hackner et al.

(10) Patent No.: US 7,279,872 B2
(45) Date of Patent: Oct. 9, 2007

(54) CIRCUIT AND METHOD FOR PROCESSING A SUPPLY VOLTAGE WITH VOLTAGE PEAKS

(76) Inventors: Michael Hackner, Jahnstrasse 14e, 92331 Parsberg (DE); Roland Ernst, Schuhstrasse 27, 91052 Erlangen (DE); Hans-Peter Hohe, Burggrub 28, 91332 Heiligenstadt (DE)

( * ) Notice: Subject to any disclaimer, the term of this patent is extended or adjusted under 35 U.S.C. 154(b) by 0 days.

(21) Appl. No.: 11/363,538

(22) Filed: Feb. 27, 2006

(65) Prior Publication Data

US 2006/0181246 A1 Aug. 17, 2006

Related U.S. Application Data

(63) Continuation of application No. PCT/EP2004/009496, filed on Aug. 25, 2004.

(30) Foreign Application Priority Data

Aug. 27, 2003 (DE) ............................... 103 39 478
Jan. 29, 2004 (DE) ..................... 10 2004 004 541

(51) Int. Cl.
*G05F 1/565* (2006.01)
(52) U.S. Cl. ..................... 323/275; 323/266; 323/303
(58) Field of Classification Search ................ 323/266, 323/273, 275, 303
See application file for complete search history.

(56) References Cited

U.S. PATENT DOCUMENTS

| 4,779,037 | A | * | 10/1988 | LoCascio ..................... 323/275 |
| 4,881,023 | A | * | 11/1989 | Perusse et al. .............. 323/266 |
| 5,191,278 | A | * | 3/1993 | Carpenter ................... 323/275 |
| 5,374,887 | A | | 12/1994 | Drobnik |
| 5,430,365 | A | * | 7/1995 | Taylor et al. ............... 323/273 |

(Continued)

FOREIGN PATENT DOCUMENTS

CA  2170827 C  5/2005

(Continued)

OTHER PUBLICATIONS

Tietze, U. & Schenk, CH.; "Halbleiter-Schaltungstechnik"; Zehnte Auflage, pp. 542-543; Springer-Verlag, Berlin; 1993.

(Continued)

*Primary Examiner*—Jeffrey Sterrett

(57) ABSTRACT

A circuit for processing a supply voltage with a voltage peak to obtain an output signal with reduced or eliminated voltage peak, comprises a first capacitance and a second capacitance, wherein a controllable resistor is formed between the first and second capacitance in series to the same, which has a high resistance when a voltage at the first capacitance is smaller than an input voltage set value, and whose resistance is reduced to a lower resistance when the input voltage at the first capacitance is higher than or equal to the input voltage set value, so that finally, when the output voltage at the second capacitance reaches an output voltage set value, the controllable resistor is substantially no longer visible, but connects the two capacitances in parallel. The circuit is particularly advantageous as filter capacitance in a switching regulator, to achieve fast starting up of the switching regulator on the one hand and, on the other hand, simultaneously, fast charging of the second capacitance, wherein the energy of the voltage peak is used for charging the second capacitor more quickly.

19 Claims, 8 Drawing Sheets

U.S. PATENT DOCUMENTS

| | | |
|---|---|---|
| 5,592,072 A | 1/1997 | Brown |
| 6,335,654 B1 | 1/2002 | Cole |

FOREIGN PATENT DOCUMENTS

| | | |
|---|---|---|
| DE | 40 07 593 A1 | 9/1991 |
| DE | 195 07 553 A1 | 9/1996 |
| DE | 197 06 491 A1 | 12/1997 |
| DE | 197 00 100 C2 | 5/2000 |
| DE | 199 46 025 A1 | 3/2001 |
| EP | 0 899 946 A2 | 3/1999 |
| EP | 0 899 946 A3 | 8/2001 |

OTHER PUBLICATIONS

National Semicondutor; "LP2975 MOSFET LDO Driver/Controller"; National Semiconductor Corporation; pp. 4-12; Jul. 2000.

National Semiconductor; "LP2989LV Micropower 500 mA Low Noise Dropout Regulator for Applications with Output Voltages < 2V"; National Semiconductor Corporation: pp. 3-8; Jan. 2002.

Seago, John; "Switching Regulator Circuit Collection"; Linear Technology; Application Note 30; pp. 14-34; Feb. 1989.

Wong, James; "Spannungsregler mit minimaler Verlustleistung"; Elektronik 40; No. 12; pp. 96 and 98-102; Munich, Germany; Jun. 11, 1991.

Carey, Eugene et al.; "Smart Solid-State Fuse Helps Designers Cure Boost-Converter Ailments"; Electronic Design; pp. 161-167; Sep. 5, 2000.

Tietze, U, & Schenk, CH,; "Halbleiter-Schaltungstechnik"; Neunte, neu bearbeitete und erwelterte Auflage, p. 564; Springer-Verlag, Berlin; 1989.

\* cited by examiner

CIRCUIT AND METHOD FOR PROCESSING A SUPPLY VOLTAGE WITH VOLTAGE PEAKS

CROSS-REFERENCE TO RELATED APPLICATION

This application is a continuation of copending International Application No. PCT/EP2004/009496, filed Aug. 25, 2004, which designated the United States, was not published in English, is incorporated herein by reference in its entirety, and which claimed priority to German Patent Application No. 10339478.8, filed on Aug. 27, 2003, and to German Patent Application No. 102004004541.0, filed on Jan. 29, 2004.

BACKGROUND OF THE INVENTION

1. Field of the Invention

The present invention relates to circuits for processing a supply voltage with voltage peaks and particularly to switching regulators where the filter capacitance has such a circuit.

2. Description of the Related Art

FIG. 7 shows a known down converter with a simple switch, such as, for example, shown in "Halbleiter-schaltungstechnik" U. Tietze, C. H. Schenk, Springer-Verlag, 9. Auflage, 1989, illustration 18.37 on page 564. The down converter in FIG. 7 comprises a ring-like circuit with a coil 400, a capacitor 402 and a diode 404. Further, the down converter or switching regulator, respectively, in FIG. 7 comprises a charging switch 406 as well as a control not shown in FIG. 7, which is formed to control the charging switch 406 such that the output voltage of the switching regulator, indicated by $U_{SR}$ in FIG. 7, is maintained on a defined level or in a range around the defined level, respectively.

The circuit shown in FIG. 7 comprises a determined number of nodes, which will be discussed below. A pole of an input voltage source $U_0$ is connected to a first input node 410 of the circuit, while another potential of the input source $U_0$ is connected to a second input node 412. The second input node 412 is typically the ground node. A first output node 414 is also referred to as first output rail or positive output rail, while a second output node 416 is also referred to as second output rail or negative output rail, respectively, when the convention shown in FIG. 7 is used for the output voltage of the switching regulator USR. On the one hand, the switch 406 is connected between the first input node 410 and a first intermediate node 418. Further, the diode 404 is connected between the first intermediate node 418 and the second input node 412, such that the anode of the diode is connected to the second input node 412, while the cathode of the diode is connected to the first intermediate node 418. Further, as shown in FIG. 7, the capacitor 402 is connected between the first output node 414 and the second output node 416. According to the configuration of the network of diode, coil and capacitor shown in FIG. 7, the coil is connected between the first intermediate node 418 and the first output node 414.

Below, the functionality of the circuit shown in FIG. 7 will be discussed. As long as the switch 406 is closed, $U_D$ is equal to the negative input voltage $U_0$. If it opens, the inductor current $I_L$ maintains its direction, and the amount of $U_D$ sinks, until the diode becomes conductive, which means to about 0 potential. The time curve of the coil current results from the law of induction, according to which the voltage at the coil is equal to the product of inductance L of the coil and the derivation of the coil current according to time. During the switch-on time, which means when the input voltage $U_0$ is applied to the diode 404, the voltage $U_0-U_{SR}$ is applied to the inductor. During the switch-off time $t_{aus}$ of the switch 406, the voltage $U_L=-U_{SR}$ is applied to the inductor. Therefore, an amount of current change $\Delta I_L$ results, which is as follows:

$$\Delta I_L = 1/L \cdot (-U_{SR}) \cdot \Delta t_{aus} = 1/L (U_0 - U_{SR}) t_{ein}$$

From this balance, the output voltage can be calculated again, which is defined as follows:

$$U_{SR} = [t_{ein}/(t_{ein}+t_{aus})] \cdot U_0 = t_{ein}/T \cdot U_0 = p \cdot U_0.$$

In the previous equation, $T=t_{ein}+t_{aus}=1/F$ is the oscillation period and $p=t_{ein}/T$ is the so called duty cycle. As expected, it can be seen that the arithmetic average of $U_D$ results as output voltage. Typically, the inductance L of the coil 400 is chosen such that the minimum current is not undershot, as is known in the art. Further, it is known that by increasing the clock frequency, the inductance can be reduced. Further, with too high frequencies, the effort for the switching transistor and the control circuit increases. Additionally, dynamic switching losses increase in proportion to the frequency.

The capacitor 402 and the inductor (400) determine the ripple of the output voltage. Generating the switching signal for switching the charging transistor 406 is usually performed by a pulse width modulator and a regulator with voltage reference. In particular, a reference voltage providing a set value is supplied to a subtracter, to which the current output voltage USR is also supplied as actual value. The output signal of the subtracter is supplied to a variable gain amplifier, feeding a comparator, to which, on the other hand, a signal generated by a saw tooth generator is supplied. The output signal of the comparator is the control signal for the switch 406 in FIG. 7. The variable gain amplifier is typically a PI variable gain amplifier. The same increases its output signal for so long until the difference at the output of the subtracter becomes 0, which means until the output voltage $U_{SR}$ is equal to the set output voltage. Typical ranges for dimensioning the coil are in the millihenry range (e.g. 2.7 mH), while typical values for capacitors are in the three-digit micro Farad range (e.g. 100 μF), when switching frequencies in the range of 50 kHz are used.

Switching regulators shown in FIG. 7 are to provide a suitable voltage supply to a subsequently connected circuit, such as an ASIC. The voltage supply consists normally of one or several constant direct voltages of, for example, +5 V or ±15 V. Frequently, the same is not available in the desired form from the start and has to be generated first by, for example, a switching regulator shown in FIG. 7 that can be supplemented by a downstream linear regulator to remove the ripples of the output voltage. Usually, a rectifier is at the input side of the switching regulator shown in FIG. 7 which generates the input voltage $U_0$ from the alternating current or three-phase current net (230 V or 400 V), respectively, of the power station.

Thus, in deviation from the switching regulator shown in FIG. 7, other regulators exist, with a transformer, a rectifier, a smoothing capacitor and possibly a linear regulator for voltage stabilization. However, the transformer is difficult to produce and thus expensive. Further, it requires a lot of space. A further disadvantage of the transformer is its frequency-depending working range. This is, for example, limited to the network frequency of 50 Hz or 60 Hz, respectively. If the frequency deviates, this also causes a deviation of the output voltage of the transformer. The voltage transfer does not work with a direct voltage at the input.

If the transformer is omitted and only rectifier, smoothing capacitor and linear regulator are used, a lot of energy in the form of heat is lost. Additionally, sufficient cooling of the linear regulator has to be provided, which is again very expensive and requires space. All this is avoided by using a switching regulator instead of the linear regulator, as illustrated with regard to FIG. 7. By the significantly better efficiency, little energy in the form of heat is lost and thus the effort for the cooling is significantly lower. As has already been discussed, the switching regulator requires an inductor (the inductance 400 in FIG. 7), which is relatively expensive in the production. However, the same has only one winding and is thus simpler to produce than a transformer having two windings. Above that, the inductor can be minimized by selecting a higher operating frequency, which also works for transformers.

Many known switching network parts, such as the switching network part shown in FIG. 7, are problematical in some regard. Normally, the input voltage range is limited to a ratio of $U_{E,max}/U_{E,min} \leq 5$, which can be seen from catalogs of different providers. This range is too low for some applications and should be increased to a ratio of about 20:1.

The voltage supply of the regulator itself is either performed via a separate voltage source or is generated from the input voltage, which means an additional voltage regulator and thus additional effort.

Further, for a flexible usage, it is intended to be able to select the input voltage significantly higher than the maximum allowable operating voltage of the regulator itself, without using additional voltage regulators for generating this operating voltage.

Additionally, when applying the input voltage, a possibly fast controlled starting of the switching regulator should be ensured. This so called starting-delay should be as small as possible, particularly for time-critical applications.

DE 199 46 025, DE 197 00 100 C2, DE 195 07 553 A1 or DE 197 06 491 A1 disclose switching regulators operating based on the basic block diagram shown in FIG. 7, wherein depending on the embodiment, the coil 400 is either connected between the first intermediate node 418 and the first output node 414, as shown in FIG. 7, or alternatively, between the second input node 412 and the second output node 416. The control voltage for the switch 406, which can be designed as transistor, is determined by the regulator determining the timing of the switch 406 or generated externally. This causes additional switching effort, which means additional costs with regard to design, testing and production. Additional costs are particular disadvantageous since switching regulators, particularly when they are provided within lamps or also designed fully integrated with an integrated circuit to be supplied, increase the price of the final product and particularly occur in chip applications where the chip area is a criterion, due to the increased chip area consumption.

Particularly when starting up a switching power supply, which means during first switching on the input voltage applied to the charging switch and the diode, it can happen that high voltage peaks occur. This is due to the fact that a high voltage peak occurs with a direction opposite in relation to the previous current direction when current is flowing through a coil and the current is switched off or converted to another current value, respectively. Since switching power supplies or switching regulators, respectively, as illustrated in FIG. 7, are based on the fact that a current is constantly switched on or off, respectively, by a coil (and a capacitor connected in series), voltage peaks can already occur. Particularly in the startup process, where the states are not defined or where initial controls have to be performed, which possibly set a current through a coil to 0, such voltage peaks can occur. If the output voltage including such a voltage peak is used, e.g., in a switching regulator to supply the control of the switching regulator, it can happen that such a voltage peak in the output signal, which is to supply the control, can lead to destruction of the control or input component of the control, respectively. This could be counteracted by designing the input stages of the control with a very high electrical strength. However, this overdimensioning with regard to electrical strength and the normal operation causes additional costs. This way is less and less practicable when very high voltage peaks and relatively low output operating voltage or output voltage set value are required, respectively. Then, the "discrepancy" between voltage design of the control on the one hand and the actual voltage to be processed by the control on the on the other hand becomes higher and higher.

DE 4007593 A1 discloses an input current peak avoiding switching power supply. For avoiding input voltage peaks when turning on or switching on a switching power supply or when reloading the switching power supply after a breakdown of the input net alternating voltage or after a setback of the same during operation, the input capacitor of a fast clocked voltage regulator is eliminated and instead an output capacitor is applied to the output of the switching power supply. Simultaneously, the fast clocked voltage regulator itself is provided with an active current limitation in order to protect the same from destruction. The fast clocked voltage regulator is provided by a rectifier, which is again connected to the net alternating voltage itself via an input filter.

It is a disadvantage of these concepts of active current limitation that the active current limitation has to be implemented in circuit technology, which particularly in integrated embodiments causes additional test effort and a potentially increased rejection proportion of the finished integrated circuit, since the number of components is significantly increased compared to the case without active current limitation.

SUMMARY OF THE INVENTION

It is an object of the present invention to provide an economical concept for processing a supply voltage with voltage peaks and particularly an inexpensive switching regulator protected from voltage peaks.

In accordance with a first aspect, the present invention provides a circuit for processing a supply voltage with a voltage peak to obtain an output voltage with reduced or eliminated voltage peaks, having: a first capacitance between a first node and a second node, wherein an input voltage can be generated between the first node and the second node due to the supply voltage; a second capacitance between a third node and a fourth node, wherein the output voltage can be tapped between the third node and the fourth node, wherein the first capacitance has a smaller capacitance value than the second capacitance; a controllable resistor between the first node and the third node; and a control device for controlling the controllable resistor, wherein the control device is formed to control the controllable resistor in a first case, where the input voltage is smaller than a predetermined input voltage set value, such that the controllable resistor has a first high resistance, to control the controllable resistor in a second case, where the input voltage is equal to or higher than the predetermined input voltage set value, and where the output voltage is smaller than the predetermined output voltage set value such that the controllable resistor has a second, lower resistance, so that a charge acceptance of the first capacitance is at least reduced and more charge flows into the second capacitance than in the case where the controllable resistor has the high resistance, and to control the controllable resistor in a third case, where the output voltage at the second capacitance is equal to or higher than a predetermined output voltage set value, such that the same has a third low resistance so that the capacitance and the second capacitance are substantially connected in parallel, wherein the first resistance is higher than the second resistance, and wherein the second resistance is higher than the third resistance.

In accordance with a second aspect, the present invention provides a method for processing a supply voltage with a voltage peak for obtaining an output voltage with reduced or eliminated voltage peaks, having the steps of: charging a first capacitance between a first node and a second node, wherein an input voltage is generated between the first node and the second node due to the supply voltage; charging a second capacitance between a third node and a fourth node, wherein the output voltage is generated between the third node and the fourth node, wherein the first capacitance has a smaller capacitance value than the second capacitance; controlling a resistor between the first node and the third node, such that in a first case, where the input voltage is smaller than a predetermined input voltage set value, the controllable resistor has a first high resistance, that in a second case, where the input voltage is equal to or higher than the predetermined input voltage set value, and where the output voltage is smaller than the predetermined output voltage set value the controllable resistor has a second lower resistance, so that charging the first capacitance is at least reduced, and that charging the second capacitance is increased compared to the case where the controllable resistor has the high resistance, and that in a third case, where the output voltage at the second capacitor is equal to or higher than the predetermined output voltage set value, the controllable resistor has a third lower resistance, so that the first and second capacitance are substantially connected in parallel, wherein the first resistance is higher than the second resistance, and wherein the second resistance is higher than the third resistance.

In accordance with a third aspect, the present invention provides a switching regulator for generating a regulated switching regulator output voltage by using an input voltage, having: a controllable switch; a network with a diode, an inductance and a filter device; a switching regulator control for regulating the output voltage by periodically operating the controllable switch to regulate the output voltage, and wherein the filter device comprises an above-mentioned circuit.

The present invention is based on the knowledge that a supply voltage provided with voltage peaks is processed such that the voltage peak is not simply cut off, but that the energy contained in the voltage peak is used to drive an output voltage faster to the set value output voltage level, compared to the case where the voltage peak would simply be cut off, i.e. the energy of the same would not be utilized. Therefore, two capacitances are coupled across a controllable resistor. A control device for controlling the controllable resistor is formed to set the controllable resistor to a high resistance when the input voltage is below an input voltage set value. When the input voltage then exceeds the set value, i.e. when the voltage applied to the first capacitor, which is equal to the input voltage, becomes higher than the predetermined value, the resistance of the controllable resistor is reduced, such that the input voltage remains constant or rises slower than the supply voltage. By reducing the resistance of the controllable resistor, it is achieved that charge flows into the second capacitor. Thus, an energy of the voltage peak is not rejected, but is used to charge the second capacitor. As soon as the voltage at the second capacitor has reached a predetermined output voltage set value, the controllable resistor is controlled to a small resistance, such that the two capacitors are mainly connected in parallel, which means operate as resulting capacitance with a capacitance value equal to the sum of capacitance values of the two individual capacitors. By controlling the resistor when the input voltage has become higher than the input voltage set value, it is achieved that the charge acceptance of the first capacitor is reduced due to the supply voltage and due to the possibly present voltage peak in the supply voltage, so that more charge flows into the second capacitance than in the case where the controllable resistor had a high resistance.

In a preferred embodiment of the present invention, the first capacitance, to which the input voltage is applied, is a relatively small capacitance, while the second capacitance, to which the output voltage is applied, is a relatively large capacitance. Thereby, it is achieved that the input voltage quickly reaches the input voltage set value, which is preferably used to supply the control of a switching regulator. By inventively controlling the resistor such that the same becomes smaller and smaller, the input voltage is limited and preferably even kept constant, so that the control, which is supplied by the input voltage, obtains no voltage peak and thus does not have to be dimensioned with corresponding electrical strength. As soon as the controllable resistor is opened, preferably monotonously dependent on the current input voltage, the energy included in the voltage peak flows into the large second capacitor and is thus used to quickly charge the second capacitor. Such a fast charging of the second capacitor is particularly required for a fast starting up of switching regulators, since the load, which the switching regulator supplies, obtains the output voltage, which means the same is connected in parallel to the second capacitor.

If the switching regulator changes to stationary operation, the controllable resistor is brought to a small resistance, such that the two capacitances are connected in parallel, and work as a single capacitance with the sum of the two capacitance values of the two individual capacitors.

Preferably, a transistor is used as controllable resistor, which is brought into a non-conductive state in the beginning, which means when the input voltage is smaller than the input voltage set value. When the input voltage set value is exceeded by the input voltage, the transistor transits into the triode domain, to be brought into the low-impedance conductive state when the output voltage has reached the output voltage set value.

In the preferred embodiment of the present invention, the transition of the transistor from the non-conductive region to the conductive region, which means stepping through the triode region of the transistor is defined and performed in dependence on the current input voltage and/or the current output voltage, so that the input voltage does not significantly decrease due to the "slow" switching through of the transistor compared to the value where the transistor was completely non-conductive. Thereby, it is achieved that the input voltage quickly reaches its set value due to the small first capacitance, which is dimensioned such that the control of the switching regulator can already operate with a voltage which is higher or equal to the input voltage set value, when the inventive circuit is used in the switching regulator. The switching regulator is ready for a load supply operation, when the transistor is fully switched through and the two capacitances work together as a single capacitance. Thus, according to the invention in a common switching regulator, the filter capacitor is replaced by the circuit for processing a supply voltage with voltage peaks. Dimensioning the individual capacitances in relation to each other is chosen such that the first capacitance is made so small that it is charged to the value required for the control in a predetermined delay after switching on, which means after applying the input voltage to charging switch and diode, while the second capacitance is then set such that it is dimensioned equal to the difference between a predetermined capacitance value for the filter capacitor, which is predefined due to the ripples of the output voltage and the capacitance of the first capacitor.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Before the inventive circuit for processing a supply voltage will be discussed in more detail, a switching regulator will be illustrated with regard to FIGS. 1 to 3a, wherein the inventive circuit for processing a supply voltage can be used instead of the filter capacitor (102 in FIGS. 2 and 3a). However, it should be noted that the inventive circuit for processing a supply voltage cannot only be used with the switching regulator concept illustrated in FIGS. 2 and 3a, but also with the switching regulator concept illustrated in FIG. 7. Further, it should be noted that the inventive circuit can be used for processing any supply voltage having voltage peaks, which are not to be passed on to an output side, or only in a reduced way, since circuits connected on the output side are not specified for such voltage peaks.

Figure 1:
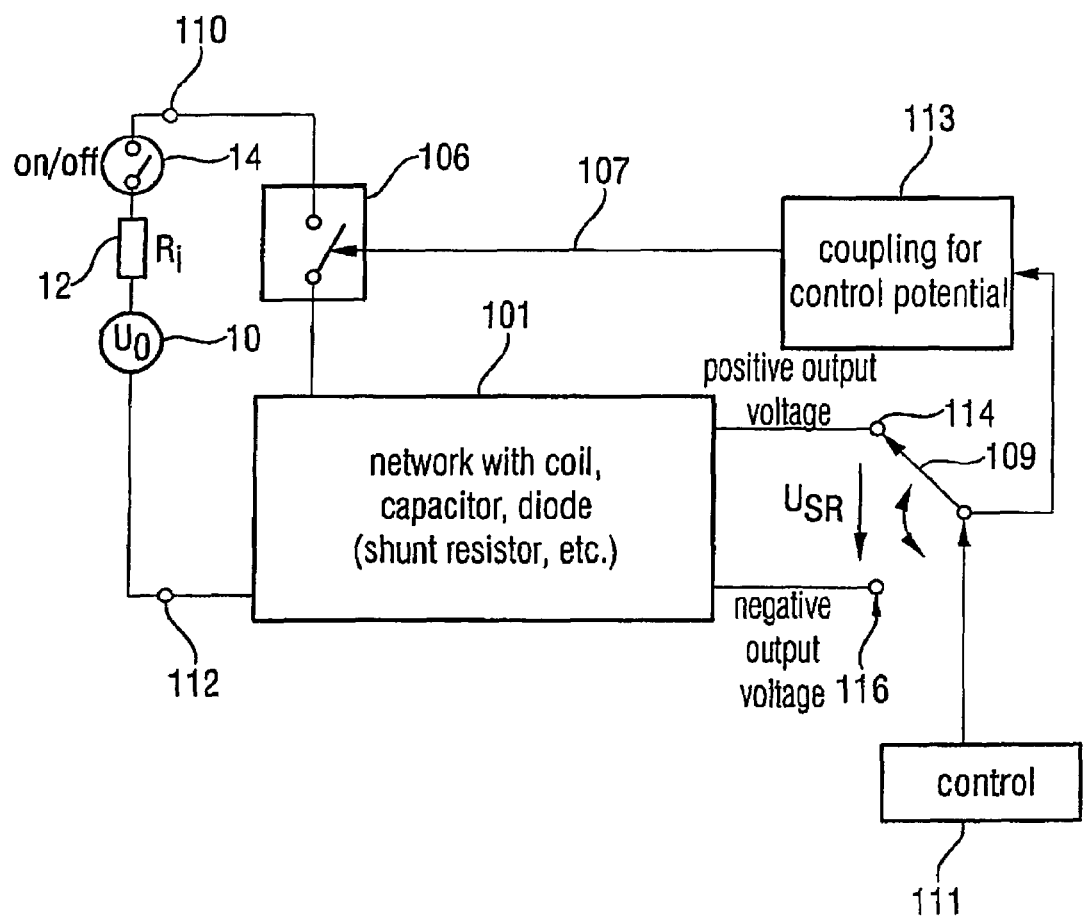
FIG. 1 is a basic block diagram of the inventive switching regulator.

FIG. 1 shows an inventive switching regulator for generating a regulated output voltage $U_{SR}$ by using an input voltage $U_0$, which is shown for clarity reasons as voltage source $U_0$ 10, which is connected in series to an inner resistor $R_i$ 12. If an on/off switch 14 is operated, a voltage is applied between a first input node 110 and a second input node 112. A controllable switch 106 and a network 108, which is a typical switching regulator network with a coil, a capacitor and a diode, are connected in series between the first input node 110 and the second input node 112. Typically, such switching regulator networks 101 also have a shunt resistor to provide a current path with a defined ohmic resistance.

The output voltage regulated by the switching regulator shown in FIG. 1 lies between a first output rail also referred to as positive output rail and identical to the first output node 114, and a second output rail also referred to as negative output rail and identical to the second output node 116. In the embodiment shown in FIG. 1, the positive output rail 114 can be brought to a first (positive) potential, while the negative output rail 116 can be brought to a second potential, which is smaller than the first potential.

The network 101 having a coil, a capacitor and a diode, has the diode particularly switched such that it is coupled to the positive output rail when the coil is coupled to the negative output rail, or that it is coupled to the negative output rail when the coil is coupled to the positive output rail. Typically, the diode will thus be coupled to an output rail, either the positive output rail 114 or the negative output rail 116.

The switch 106 shown in FIG. 1 is also referred to as charging switch, since it is provided for switching the capacitor in the network 101. Particularly, it is connected in series to the diode. The charging switch comprises further a control input 107, across which the charging switch 106 can be closed, which means that the input voltage does not drop at the charging switch but at the network 101. If, however, the switch is opened, the input voltage drops across the switch, the network 101 is thus not provided with the input voltage (apart from transient states).

Thus, the charging switch can be closed or opened via the control input 107. Further, the network 101 comprises a capacitor, which is also referred to as filter capacitor and is switched such that the regulated output voltage can be trapped at the capacitor. Further, a significant part of the network 101 is the inductance, which will be referred to below as coil, which is on the one hand coupled to the diode and on the other hand to the capacitor.

According to the invention, the switching regulator shown in FIG. 1 further comprises a change-over means 109, which is controllable to couple either the first output rail 114 or the second output rail 116 to the control input 107 of the charging switch via a coupling means 113 depending on a change-over control signal provided by a control 111. Particularly, the charging switch 106 is formed such that it is closed due to a potential at an output rail, and opened due to a potential at the other output rail. In embodiments discussed below, the charging switch 106, as will be discussed below with regard to FIGS. 2 and 3a, is designed as normally-on or normally-off NMOS transistor. In that case, the charging switch 106 is closed (made conductive) by the potential at the positive output rail, while it is opened (open-circuited) by the potential at the negative output rail.

If the switch 106 is designed as PMOS transistor, the coil 100 and possibly the shunt resistor 101 will be connected between the nodes 118 and 114, and the nodes 112 and 116 are short-circuited. The potential at the negative output rail will be used to open the switch while the potential at the positive output rail 114 is used to close the switch 106, which means to bring it into open-circuit operation. A respective circuit is shown in FIG. 3b.

Normally, the control 111 will comprise a regulator which can be designed in any way, as long as it outputs a signal which causes the output voltage $U_{SR}$ to have a defined desired time curve by opening and closing the charging switch 106. Normally, the regulator 111 will operate such that it ensures an output voltage with an average value at the output 114, 116 of the network 101, independent of which load is switched on or which current draws a load, respectively. The time curve of the voltage $U_{SR}$ will typically be a voltage curve with certain ripples around an average value. The ripples can be brought within predetermined tolerance ranges by dimensioning the coil and capacitor, whereby in many cases a signal with ripples around an average value is already sufficient, particularly when the requirements of the switching regulator output signal, which means the voltage $U_{SR}$, are not very high, such as for a lamp or something similar. On the other hand, in the case where the switching regulator as shown in FIG. 1 is integrated on a substrate together with an integrated circuit, which is to be supplied by the same, the same can also be supplemented by a linear regulator downstream of the output 114, 116' of the switching regulator, to fulfill requirements of a voltage $U_{SR}$, which exceed the possibilities of the switching regulator shown in FIG. 1, to provide an output signal $U_{SR}$ with corresponding specification with reasonable effort.

The switch-on/switch-off control is performed such that when the control 111 determines the charging switch is to be opened, the change-over switch 109 is connected to the output rail associated to opening the charging switch 106, in FIG. 1 for example 116, while when the charging switch 106 is to be closed because the capacitor in the network 101 has to be recharged, the control 111 activates the change-over switch 109, to now couple the potential of the upper output rail 114 to the control input 107 of the charging switch 106.

Figure 2:
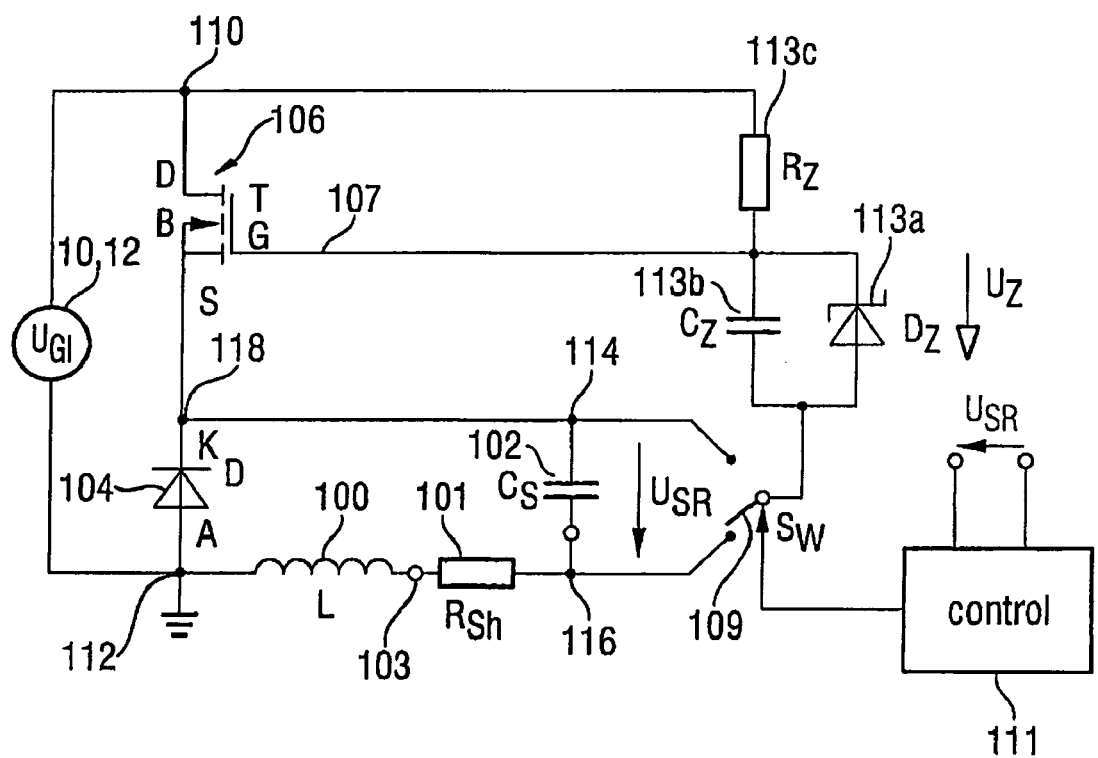
FIG. 2 is a preferred embodiment of the inventive switching regulator with a normally-off transistor as charging switch.
Figure 7:
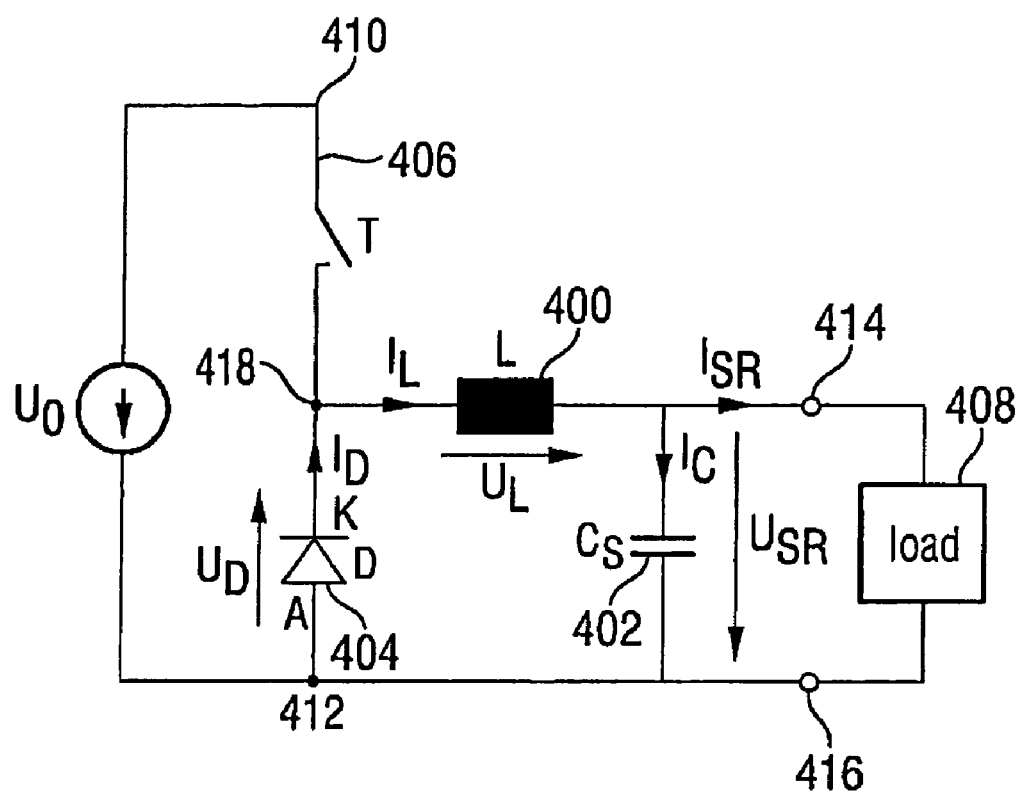
FIG. 7 is a block diagram of a known switching regulator also known as buck converter.

FIG. 2 shows a preferred embodiment of the present invention, where the coil 100 is connected to the diode 104 and the filter capacitor 102. In the comparison of FIG. 2 and FIG. 7, it becomes clear that the coil 100 is no longer connected to the cathode of the diode 104 as in FIG. 7, but with the anode of the diode 104. Further, it can be seen from the comparison of FIG. 2 and FIG. 7, that now the positive output rail 114 with an intermediate node 118, across which the charging switch is connected to the diode 104, coincides with the output node 114, which means the first output rail. Further, a shunt resistor $R_{Sh}$ 101 is shown in FIG. 2, which is connected between the coil 100 and the negative output rail 116. A node 103 between the shunt resistor 101 and the coil 100 is also referred to as lower intermediate node.

Particularly, the charging switch 106 in the embodiment shown in FIG. 2 is designed as normally-off NMOS transistor, whose drain D is connected to the first input node 110, and whose source S is first short-circuited to a bulk terminal B of the transistor, and whose source S is further directly coupled to the positive output node 114, which means the positive output rail. In the embodiment shown in FIG. 2, the coupling means 113 of FIG. 1 comprises a Zener diode $D_Z$ 113a, a capacitor $C_Z$ 113b connected in parallel as well as a series resistor $R_Z$ 113c. The series resistor serves to supply the parallel circuit of the capacitor 113b and the diode 113a forming a voltage drop means across the first input node 110 with current, as will be discussed below.

For the mode of operation of the switching regulator shown in FIG. 2 and switching regulators in general, respectively, the transient characteristics of the memory elements coil L and capacitor $C_s$ are important, since the switching regulator as shown in FIG. 2 achieves a regulation of the output voltage by constantly switching on and off of the charging switch 106.

A coil is characterized in that the voltage falling across the coil is equal to the time leakance of the current flowing through the coil. Correspondingly, a capacitor is characterized in that the current flowing through the capacitor is proportional to the time leakage of the voltage applied to the capacitor.

Further, with regard to the coil, it is of great significance that the voltage applied to the coil can jump, but that the current through the coil cannot jump. Thus, if a coil is switched on, which means a direct voltage (across a source inner resistor) is applied to the coil, the voltage at the coil will increase abruptly to the value of the applied direct voltage and then falls exponentially. Simultaneously, the current slowly starts to increase through the coil from its original value 0, until it reaches the value which is equal to the quotient from the applied voltage and the inner resistor of the source. When this stationary time is reached, the voltage falling across the coil has also become 0.

The same applies inversely to the capacitor. If the capacitor is switched on, the voltage will increase slowly at the capacitor, while the current through the capacitor can jump.

Thus, the elements coil and capacitor differ in that the current can jump through the capacitor while the voltage can jump at the coil. However, the voltage at the capacitor cannot jump. The same applies also to the current through the coil, it cannot jump either. This leads to the fact that the coil operates as short at the time of switching on, which means at the time t=0, when switching on takes place at the time t=0, while the capacitor operates as short.

In the following, reference will be made to switching off of the elements. If a capacitor charged to a direct voltage is separated from the direct voltage source, nothing will happen. The same holds the charge when it cannot discharge across a resistor. However, if switching-off of the capacitor takes place across a short, this causes that a very high current flows, wherein at this time the current and voltage arrow at the capacitor point to opposite directions. Thus, the capacitor operates as generator when it is switched off.

If a coil, through which current is flowing, is switched off, it is again of significance how the coil is switched off. If current is flowing through the coil, a magnetic field exists, wherein energy is stored. If a coil is separated from the source by an open between source and coil, the current through the coil would actually be brought to 0 immediately. However, the energy stored in the magnetic field of the coil has to be allowed to leak. Thus, switching off a coil by generating an open between the source and the coil leads to a high voltage peak, which leads to an arc being formed at the switch across which the energy stored in magnetic field can leak off to the source. For that reason, a coil is discharged across a resistor, a diode or a capacitor in order to avoid the theoretically infinitely high voltage peaks, which would have a destructive effect. This leads to a voltage peak with reduced height. If a coil is switched off, the voltage arrow and the current arrow again point to opposite directions. Thus, the coil operates as generator.

If, as shown in FIG. 2 (or FIG. 3a), the coil is connected in series to a capacitor, then the capacitor is a short and the coil an open at the time of switching on, which means when a voltage of 0 is changed to a voltage with a certain direct voltage value. Thus, the whole switch-on voltage is first applied to the coil and sinks then with increasing current through the series circuit of coil and capacitor. At the time of switching-off a voltage at the coil, the coil still generates a current, which keeps flowing for a certain time, until the energy stored in the coil (or the energy stored in the capacitor, respectively) has leaked off.

The functionality of the switching regulator in stationary state will be described below with reference to FIG. 2. At the time when the switch 106 is closed, the full voltage $U_{G1}$ 10, 12 is applied to the diode 104. A current flows across the switch 106 and the coil 100, which charges the capacitor 102. Thus, the potential of the positive output rail 114 rises relative to the negative rail.

On average, the current through the coil 100 is equal to the current supplied to the load connected between the positive output rail 114 and the negative output rail 116.

As long as the switch is off, the inductor feeds the capacitor across the free wheeling diode. As long as the inductor current is higher than the load current, the voltage at the capacitor increases. The more energy passes from the inductor to the capacitor, the smaller becomes the inductor current. At some stage, the inductor current becomes smaller than the load current and from that time onwards the voltage at the capacitor sinks.

In order to avoid that the voltage sinks too far, the switch has to be switched on again, so that the inductor current rises again. However, at the time of switching-on, the inductor current is still lower than the load current, so that the voltage at the capacitor first decreases further. With a conductive switch, the inductor current increases again and becomes at some time larger than the load current. From that time onwards, the voltage at the capacitor increases again. If the current through the inductor becomes too large, the switch is closed again and the current through the inductor becomes smaller again. Now, the cycle starts again from the beginning.

At switch-on time, the node 118 is drawn to the potential of the node 110. Accordingly, the full input voltage $U_{GL}$ is applied to the diode 104. Since the voltage $U_{SR}$ across the capacitance $C_S$ cannot jump, but the voltage cross the coil L, the node 116 is also drawn high, so that the voltage $U_{SR}$ remains constant. Accordingly, the voltage $U_{GL}-U_{SR}$ is applied to the inductor L, so that the current through the inductor increases according to the equation $dI_L/dt=(U_{GL}-U_{SR})/L$. Here, the voltage drop at Rsh has been neglected. Since after switching off the switch 106, the current of the inductor can no longer flow through the source $U_{GL}$ and the switch 106, and the inductor avoids a jump of its current, this current has to continue to flow across the free wheeling diode 104. However, this leads to the fact that the potential of the node 118 jumps to a potential which lies about 0.7 V below the potential of the node 112 corresponding to the characteristic curve of this diode. Again, the capacitor $C_s$ avoids a jump of the voltage $U_{SR}$. Thus, at switch-off time, the potential of the node 116 jumps to $-(0.7\ V+U_{SR})$. Consequently, a negative voltage is applied to the inductor (node 103–node 112), so that the current through the inductor 100 decreases corresponding to the equation $dI_L/dt=(U_{SR}+0.7\ V)/L$.

In other words, since the full voltage is applied to the diode 104 at the time of switching-on the switch 106, and since the voltage at the capacitor cannot jump as discussed above, but can jump at the coil, the potential of the negative output rail 116 is risen simultaneously the switch-on time.

Thereby, the full input voltage is applied to the inductor 100, whereby current starts flowing through the inductor 100, which also charges the capacitor 102. If the resulting voltage at the capacitor is high enough, the control 111 will operate the change-over switch 109, such that it is no longer connected to the positive output rail 114 but to the negative output rail 116. This leads to the fact that the transistor 106 is non-conductive and that no current flows from the source 10, 12 into the network of coil, diode and capacitor. This leads to the fact that the coil operates as generator, in that the potential at the node 103 falls and the coil dispenses a current which continues to charge the capacitor 102 across the diode 104, so that after switching off the switch, the voltage $U_{SR}$ rises further. This increase is decelerated by the current flowing across the load, and turns then into a voltage drop when the current drawn through the load becomes smaller than the current supplied by the coil 100 to the node 114. This voltage drop becomes larger, since the coil does no longer provide enough current. Before the voltage becomes too small, the control acts again and connects the change-over switch 109 again to the positive output rail, which leads to the fact that the switch 106 is closed again and supplies current. Due to the above discussed connections, the output voltage $U_{SR}$ decreases further after switching on, until the positive node 114 of the capacitor has "followed" and the voltage $U_{SR}$ rises again. At some time, the control will operate the change-over switch 109 again, so that the same is connected to the negative output rail 116, so that the transistor 107 is non-conductive, which again causes that the voltage rises further, due to the energy stored in the coil (and the capacitor), which leads to a current across the diode 104 and in the positive node 114.

In this embodiment, the switch 106 shown in FIG. 2 is designed as normally-off NMOS transistor. NMOS transistors are conductive when the voltage between the gate, which means the control terminal 107 and the source, is higher than a possibly present threshold voltage. Normally-on NMOS transistors already conduct at a voltage $U_{GS}>0$. In the normally-off NMOS transistor shown in FIG. 2, the voltage between the gate 107 and the source (node 118 in FIG. 2) has to be higher than the negative of the amount of the threshold voltage $U_{th}$ of the transistor 106. For that reason, the coupling means 113 of FIG. 1 comprises the elements series resistor 113c, parallel capacitor 113b and Zener diode 113a shown in FIG. 2a.

The Zener diode 113a is configured such that it operates as voltage source from a certain breakdown voltage onwards, which is configured in a fixed way, which means, in other words, that the breakdown voltage $U_Z$ determined by the Zener diode always falls at the parallel circuit of capacitor 113b and diode 113a. If the change-over switch 109 is connected to the positive rail 114, the voltage $U_Z$ falling at the Zener diode is always applied directly between the gate and source of the transistor. The control input 107 of the transistor is thus coupled to the positive output rail across the parallel circuit of capacitor and Zener diode, in that the transistor becomes conductive.

The only constraint therefore is that the breakdown voltage determined by the Zener diode is higher than the threshold voltage of the transistor. However, this prerequisite can easily be fulfilled, since threshold voltages of transistors are typically not very high and Zener diodes with different defined breakdown voltages exist. Further, the Zener diode only has to be adjusted very loosely to the transistor, since the value of the breakdown voltage of the Zener diode has to be only higher than the threshold voltage $U_{th}$ of the transistor. Thus, the requirements of the threshold voltage of the transistor 106 and the breakdown voltage of the diode 113a with regard to the required tolerance are very low.

Since the requirements for the connection between threshold voltage of the transistor and breakdown voltage of the diode are very loose, deviations of the available transistors can be accepted without a circuit becoming rejected. Thus, the illustrated concept is particularly advantageous in that the rejection rate and thus the costs of the final product can be kept low.

If the control determines that the switch 106 is to be switched off again, it controls the change-over switch 109 such that the same is connected to the negative output rail. This leads to the fact that the potential at the gate 107 of the transistor becomes smaller by $U_{SR}$ than in the switched on state. Thereby, the transistor is non-conductive.

It is a particular advantage of the circuit shown in FIG. 2 that defined starting of the circuit is ensured. For the defined starting it is particularly unimportant at first, whether the change-over switch 109 is connected to the positive output rail 114 or the negative output rail 116 at switch-on time. Particularly when the change-over switch 109 is realized as multiplexer of transistors or as inverter, it is not defined whether the change-over switch 109 is connected to the upper rail 114 or the lower rail 116, when it is assumed that the whole circuit shown in FIG. 2 has been in a voltage free state prior to switching on, so that all potentials in the circuit are at the value 0.

This starting state, where all potentials are equal 0, will be assumed below, to represent a starting process of the circuit in FIG. 2. Since all potentials equal 0, the potential between gate 107 and source 118 of the switch also equals 0. Since the transistor is a normally-off transistor, the switch is closed at first. If a positive voltage 10, 12 is applied between the first input node 110 and the second input node 112, which is typically the ground node, then first the capacitor $C_Z$ 113b will be charged across the series resistor $R_Z$, until the voltage at the capacitor $C_Z$ 113b and the Z diode $D_Z$ parallel thereto reaches the threshold voltage $U_{th}$ of the transistor switch 106. As has been discussed, it is unimportant whether the change-over switch 109 is connected to the node 114 or the node 116.

If the change-over switch 109 is connected to the node 114, the voltage $U_Z$ will drop directly between the gate 107 and the source 118 of the transistor.

However, if the change-over switch 109 is connected to the negative rail 116, the capacitor 113b also charges across the series resistor $R_Z$. The potential at the node 118 determining the source potential of the transistor is at first not changed from its 0 value, since no charging of the capacitor 102, by which the potential 118 could be risen, takes place, since the change-over switch 109 is connected to the negative rail 116.

Thus, in both instances of the switch 109, the gate source voltage increases from a value of 0 at the time of switching on the source 10, 12 by operating the switch 14 in FIG. 1 to a value equal to the threshold voltage of the transistor. As soon as this is the case, the drain source path of this switch 106 becomes conductive, and the capacitor $C_S$ is charged (independent of the position of the switch 109). The charging current for the capacitor 102 ($C_S$) flows at the same time across the coil 100 to ground 112. This leads immediately to the fact that the output voltage $U_{SR}$ increases compared to the potential at the negative output rail 116, due to the increase of the potential at the positive output rail 114. This charging process continues until the voltage at the capacitor $C_S$ reaches the voltage at the Z diode minus the threshold voltage of the switch 106.

If the change-over switch 109 is connected to the positive output rail 114, the charging process will be continued, since the transistor 106 is open. If, however, the change-over switch 109 is connected to the negative rail 116, the switch will be closed again, when the potential between gate and source is equal to the threshold voltage. If it is assumed that the potential at the source equals $U_{SR}$, and when it is assumed that the potential at the gate of the transistor is equal to the voltage drop at the Zener diode $U_Z$, a value $U_{SR}$ results at the output of the switching regulator, where the transistor is non-conductive again, as a difference between the voltage at the Zener diode and the threshold voltage. If further measures were taken, the transistor would become non-conductive again and the output voltage would remain at $U_{SR}=U_Z-U_{th}$.

By dimensioning the Zener diode 113a this "remaining value" of the output voltage $U_{SR}$ could be chosen freely. In one embodiment, the Zener diode is dimensioned such that $U_{SR}$ becomes so high (when in the "worst case" the change-over switch 109 is connected to the negative rail 116 for startup), that the control 111, preferably supplied by $U_{SR}$, can already operate. Thus, by dimensioning the Zener diode (and the threshold voltage), the voltage $U_{SR}$ is made so high that when this voltage is applied to the control, the states at the nodes in the control are already defined.

Thus, the control will detect a value $U_{SR}$ and compare the same to a limiting value. As soon as the control determines that $U_{SR}$ has obtained the predetermined state during starting up, the control 111 is effective to ensure that the change-over switch 109 is connected to the positive rail 114. If this had already been the case in starting, the control 111 performs no change of the change-over switch 109. If, however, this was not the case, which means the switch 109 as shown in FIG. 2 was connected to a negative rail 116 at the time of startup, the control will control the change-over switch 109 such that now no longer the negative rail 116 is coupled to the control terminal 107, but that the positive rail 114 is coupled to the control input 107. Thus, the potential of the positive output rail is applied to the anode of the Z diode. Thereby, the voltage at the filter capacitor $C_S$ 102 continues to increase due to the charging current flowing through the charging switch 106, until a desired output voltage is applied to $C_S$. Now, the actual voltage regulation follows, by changing over the change-over switch 109 by the control 111 to switch the switch T on or off, respectively, and to thereby regulate the output voltage $U_{SR}$ according to voltage and current requirements of a load (not shown in FIG. 2).

Thus, the circuit shown in FIG. 2 is particularly advantageous in that it starts up in a defined way, wherein it is unimportant at the time of startup in which position the switch 109 is. Further, it is preferred to dimension the control 111 such that it already operates in a defined way when the output voltage is equal to the Zener diode voltage $U_Z$ minus the threshold voltage of the transistor 107. Thereby, the startup process can be continued in a defined way without individual supply for the control 111. This leads particularly to an inexpensive circuit, since no specific startup measures have to be taken, except ensuring that the change-over switch 109 is connected to the positive rail 114. Since no specific measures are required and particularly no voltage checks have to be performed with regard to the control 111, the startup process takes place very fast.

Further, it should be noted that the voltage rise can be dimensioned very fast by respective dimensioning of the resistor 113c and the capacitor 113b. Thus, it is preferred anyway to dimension the resistor 113c relatively large, so that the power loss generated by the same does not become significant. Further, it is preferred to dimension the capacitor $C_z$, which anyway only serves for stabilizing the Zener diode 113a or its (smaller) barrier layer capacitance, also in a small way, so that it is quickly charged to the voltage $U_Z$. Thus, starting up takes place without having to consider time constants which would significantly decelerate starting up the switching regulator.

Figure 3A:
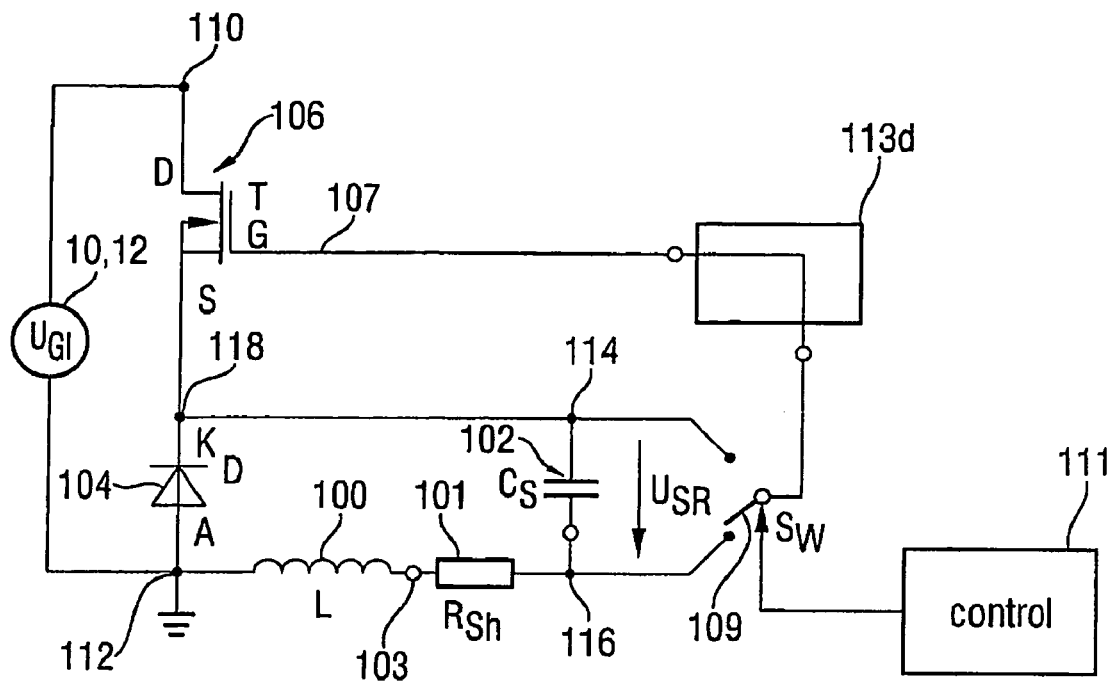
FIG. 3a is an alternative preferred embodiment of the present invention with a normally-on transistor as charging switch.
Figure 3B:
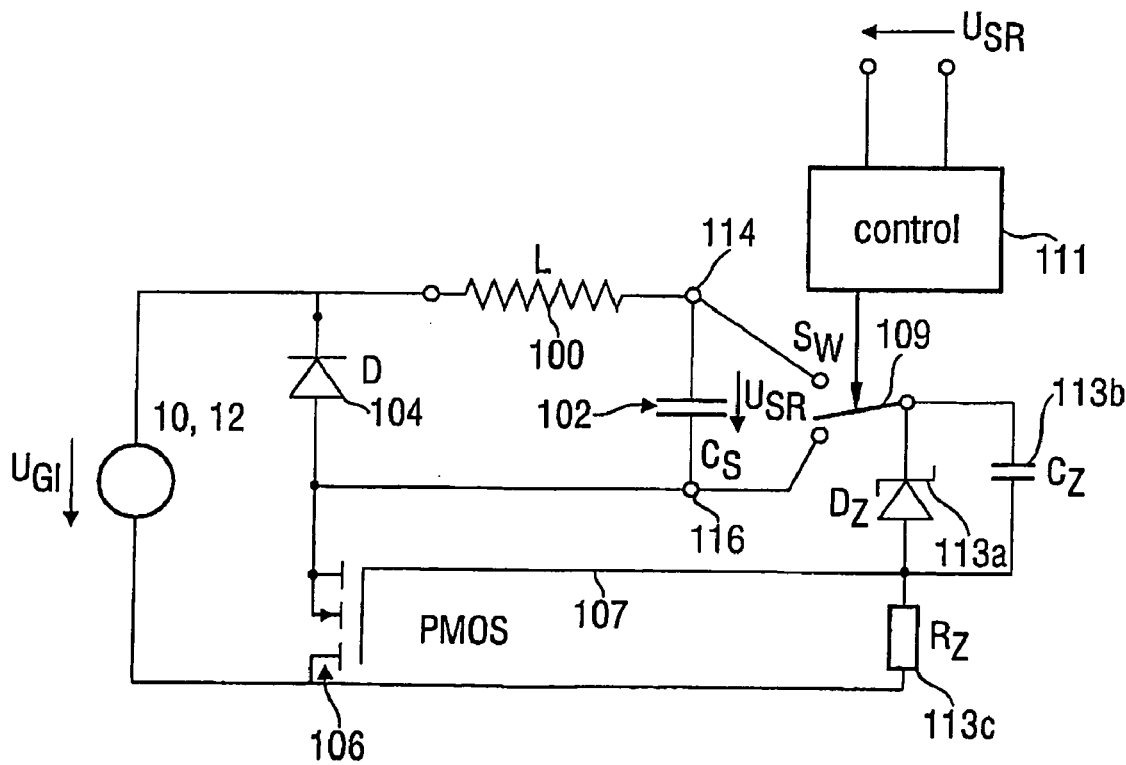
FIG. 3b is an alternative embodiment with a PMOS transistor as switch.

FIG. 3a shows an alternative embodiment differing from FIG. 2 in that the transistor T 106 is now a normally-on NMOS transistor and that the coupling means 113 of FIG. 1 realized in FIG. 2 by elements 113a, 113b, 113c is realized in FIG. 3a by a simple coupling 113d. While in FIG. 2 the potential had been provided with a voltage drop at the first output rail or the second output rail across the coupling means 113, in FIG. 3a, the potential at the first output rail 114 or the second output rail 116 is directly coupled to the control terminal 107 of the switch 106 by a simple connection. The transistor 106 is designed as normally-on n channel MOSFET or n channel JFET. The configuration of the transistor forming the charging switch 106 is identical to the case of FIG. 2 with regard to drain and source.

The voltage source or voltage drop means, respectively, from the Z diode with the series resistor and the parallel capacitor of FIG. 2, is omitted in FIG. 3a to achieve a direct potential coupling from an output rail to the control terminal 107 of the switch. Preferably, the threshold voltage of the transistor $U_{th}$ is dimensioned such that it is equal to the Z voltage of the Z diode minus the threshold voltage of the normally-off MOSFET in the first case, so that the output voltage $U_{SR}$ achieves a value in the starting process by which the control 111 can already be operated in order to be able to control the turnover switch 109 at a time of the startup process such that it is connected to the positive rail 114 in a defined way.

Threshold voltages in normally-on NMOS transistors or N JFET transistors are defined in that they define a negative voltage between gate and source of the transistor, where the transistor 106 is just non-conductive. Voltages, which are higher than the negative threshold voltage, cause then that the transistor conducts, while voltages that are more negative than the threshold voltage cause the transistor to turn into a non-conductive state.

In the following, the startup process of the circuit shown in FIG. 3a will be discussed. Again, it is assumed that all potentials are equal to 0 in the output state. Thus, the switch conducts (it is designed normally-on), which causes the potential at output rail 114 to be raised. It should be noted that at the time of switching on, first both the node 114 and the node 116 are raised to the direct voltage potential, but that the potential difference between the node equals 0. The two nodes 114 and 116 are abruptly raised, since the capacitor, as has been discussed, operates as short at the time of switching-on a direct voltage. Only when charge is provided to the node 114 across the charging switch 106, a potential difference occurs between the node 114 and the node 116, which causes the output voltage $U_{SR}$ to rise from 0 V to values of more than 0 V. Thus, after switching on the voltage, the capacitor 102 is charged across the transistor, which is normally-on.

If the change-over switch 109, which is again designed such that its starting state is undefined, is connected to the positive rail 114, the charging process will be continued, since gate and source of the transistor are shortened, such that $U_{GS}=0$ V, which always means a conductive state between drain and source in the normally-on transistor. If, however, the change-over switch 109 is connected to the negative rail, the charging state will eventually stop, since the source potential, namely the potential of the positive rail 114, constantly increases. When the source potential is higher than the threshold voltage, the transistor is non-conductive and the output voltage $U_{SR}$ does not raise any further. Thus, as has been discussed, the threshold voltage of the transistor 106 is chosen such that an output voltage $U_{SR}$ applied to the output is already sufficiently high to let the control 111 supplied with the voltage $U_{SR}$ operate in a defined way, so that the same separates the change-over switch 109 from the negative rail 116 and connects the same to the positive rail 114, so that the transistor is opened again, so that the charging process of the capacitor 102 can be continued until the control 111 moves to normal operation and performs a switch control due to a actually desired output voltage $U_{SR}$.

In summary, the start-up process in FIG. 3a is such that first the switch T conducts. After applying a positive input voltage $U_{G1}$ to the input of the circuit, the capacitor 102 is charged via the switch T and the inductor L, until the voltage at the capacitor $C_S$ reaches the threshold voltage of the switch T (when the change-over switch 109 was connected to the negative rail 116). Then the voltage at the output of the circuit $U_{SR}$ is already so high that a controlled operation of the regulator is ensured. The same switches the change-over switch $s_w$ such that the positive rail of the output voltage $U_{SR}$ is applied to the gate terminal of the switch. Thereby, the voltage at $C_S$ raises further, until the desired output voltage is applied to $C_S$. Now, the actual voltage regulation follows. By changing over the change-over switch $s_w$ through the regulator circuit 111, the switch T is switched on and off, whereby the output voltage $U_{SR}$ is regulated.

With regard to dimensioning the threshold voltage of the transmitter 106 in the case of FIG. 3a or the threshold voltage of the transistor 106 and the Zener diode voltage $U_Z$ of FIG. 2, respectively, it should be noted that these values are dimensioned such that the maximum output voltage value $U_{SR}$, which is obtained automatically without manipulating the circuit and with predetermined position of the change-over switch 109 on the negative rail 116, which results by itself without any intervention, is already so high that the control can be supplied with $U_{SR}$.

If the control 111 or the threshold voltage, respectively, or the threshold voltage and the Zener diode voltage, respectively, are dimensioned such that the output voltage $U_{SR}$, which is obtained "automatically" is already slightly higher than the voltage where the control 111 operates in a defined way, the control 111 can also be designed to turn the change-over switch 109 up, which means to the positive output rail, immediately, when the same can operate in a defined way, which means when the input voltage is sufficiently high. Thus, the change-over time is not limited to the fact that always the maximum automatically obtainable output voltage has to be present to change-over the switch. Instead, it is required that at some stage in the startup process, it is ensured that the change-over switch is connected to the positive output rail 114.

If, however, a control were used, which operates independent of $U_{SR}$, it could be ensured from the beginning, which means already, for example, at the time of switching on the direct voltage $U_{G1}$, that the switch 109 is connected to the positive rail 114. Due to the simplicity of the circuit, however, it is preferred that the control 111 is supplied by the output voltage $U_{SR}$, wherein in that case the dimensioning of the transistor and possibly the diode is pushed to a limit, in that, for example, 90% of the maximally settable output voltage $U_{SR}$ are used up to change over the change-over switch 109, so that the requirements for the control become as low as possible, since typically circuits that can already be used with low voltages are not compatible with the other voltage levels of the circuits shown in FIGS. 2 and 3a, so that an output voltage $U_{SR}$ is preferred, which is as high as possible and settles automatically.

In the embodiments shown in FIGS. 2 and 3a, the coil is not coupled to the cathode of the diode as in FIG. 7, but to the anode. This has the advantage that when the change-over switch 109 is connected to the positive rail 114, the potential generated between gate and source of the transistor is not effected by the transient characteristic of the coil. In another embodiment, the coil can also be coupled to the diode on the cathode side, such that the change-over means 109, when it connects the positive rail to the transistor gate 109, either couples or shortens the coil directly to the gate of the transistor, or indirectly couples the same via a voltage drop means.

Disposing the coil on the anode side of the diode has further the advantage that the input voltage of the circuit is only limited by the electric strength of the three elements switch, diode and inductor. Further, the switching regulator supplies itself and starts up in a defined way. Jumping of the common-mode potential of the output voltage between the positive and the negative rail of the input voltage depending on the state of the switch T is of no primary importance for the load, since it does not notice anything of this jumping, since the load merely experiences the potential difference between the upper output rail and the lower output rail, but not the "absolute" potential of the positive output rail or the negative output rail itself.

As has already been discussed, the starting time itself is defined by the dimensioning of $R_Z$ and $C_Z$, the inductance of inductor L and the capacitance of the filter capacitor $C_S$. An additional starting delay for ensuring the voltage supply of the regulator is not required.

Further, it should be noted that by the inventive concept, the input voltage range, which is normally limited to an input voltage ratio of $U_{E,max}/U_{E,min}<5:1$, can be increased according to the invention to at least 50:1, as long as the electric strength of the diode, the coil and the switch is correspondingly entrained, since those elements are provided by the input voltage. However, neither the capacitor nor the change-over switch nor the control are provided with such high voltages, so that the maximum input voltage does not have to be considered for these elements, which again results in an inexpensive and at the same time more flexible switching regulator concept according to the present invention.

Figure 4:
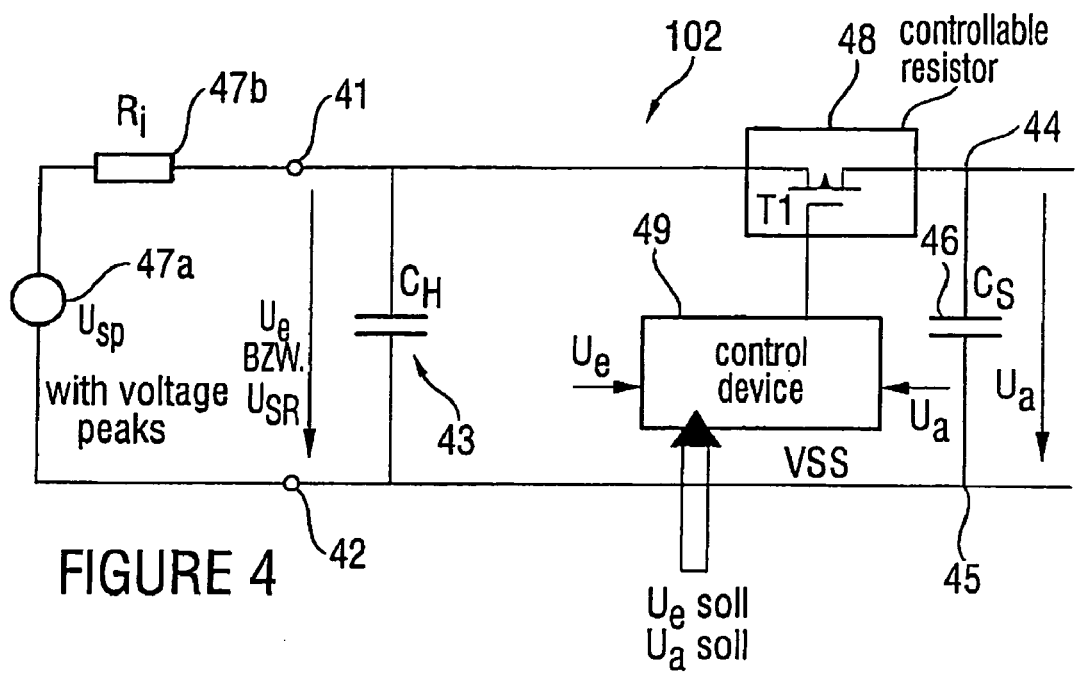
FIG. 4 is a block diagram of the inventive circuit for processing a supply voltage with a voltage peak.

FIG. 4 shows an inventive circuit with a first input node 41 and a second input node 42, between which a first capacitance 43 is connected. Further, the circuit shown in FIG. 4 has a first output node 44 and a second output node 45, between which a second capacitance 46 is connected. A supply voltage with a voltage peak is applied between the input nodes 41, 42, which is sketched in FIG. 4 merely exemplarily as voltage source 47a with an inner resistor 47b. Further, a controllable resistor 48 is connected between the first input node 41 and the first output node 44, which can be controlled by a control device 49. Preferably, the control device 49 receives an input voltage set value $U_{esoll}$ and an output voltage set value $U_{asoll}$. Further, in a preferred embodiment of the present invention, the control device 49 receives the actual value of the input voltage $U_e$ as well as the actual value of the output voltage $U_a$. It should be noted that the set values can be programmed into the control device 49 in fixed way. Further, it should be noted that the two set values $U_{esoll}$ and $U_{asoll}$ can be equal or different. If they are different, it is preferred that the output voltage set value $U_{asoll}$ is higher than the input voltage set value $U_{esoll}$.

In a preferred embodiment, the nodes 42 and 45 are on the same potential.

If the approximate time curve of a voltage peak of the supply voltage 47a is previously known, which can be the case in certain applications, such as in a switching regulator, the control device 49 does not require the current input voltage value $U_e$ or $U_a$. Instead, it can have a corresponding state machine or another means to control the resistor 48 from a high resistance preferably monotonously falling to a low resistance, according to a predetermined time curve. If the time curve of the voltage peak is not immediately known, it is preferred to perform a set value/actual value comparison of the input voltage and/or the output voltage.

Figure 5:
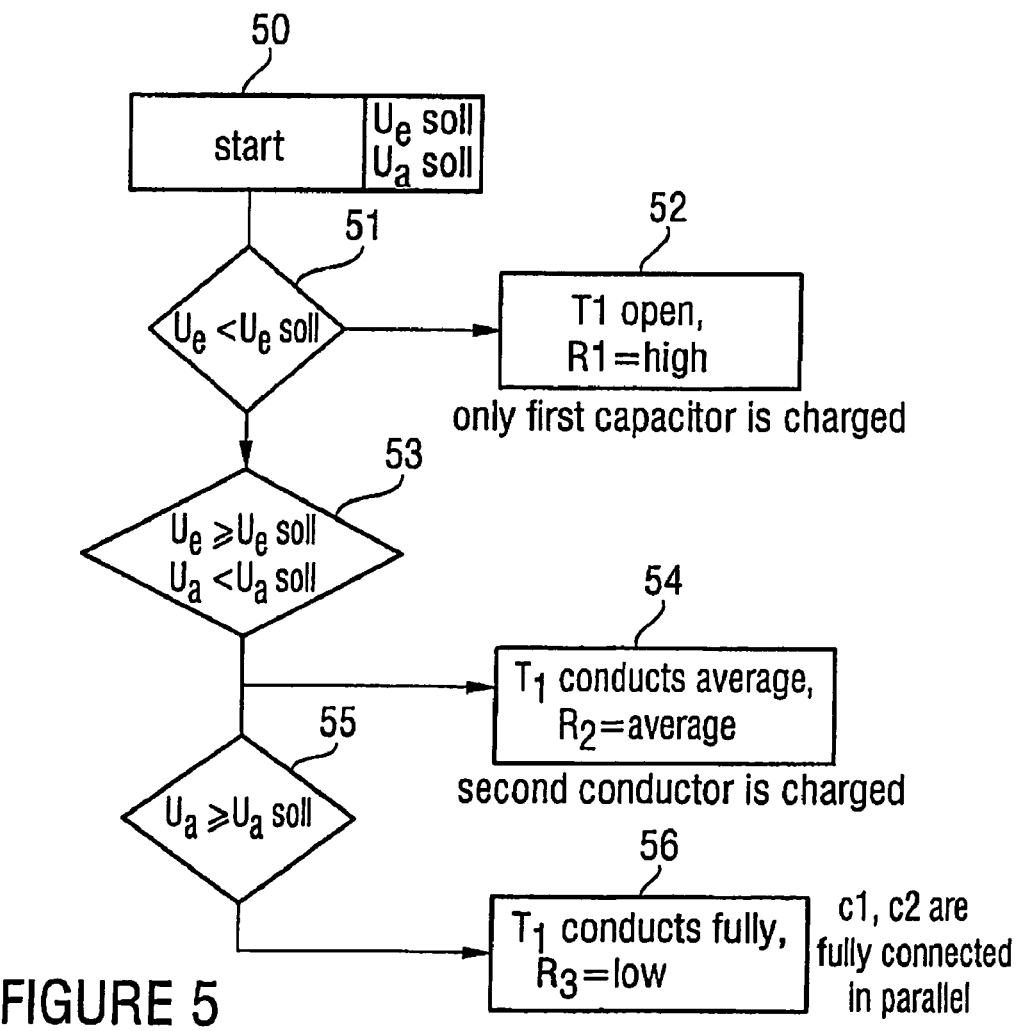
FIG. 5 is a flow diagram for discussing the mode of operation of the control device in FIG. 4.

Irrespective of whether a set value/actual value comparison or a predetermined time curve is performed in the control device 49 for controlling the resistor, etc., the control device is formed to control the controllable resistor in a first case, where the input voltage $U_e$ is smaller than the predetermined input voltage set value $U_a$, such that the controllable resistor has a first high resistance $R_1$ as shown in a block 52 in FIG. 5. The comparison of the actual input voltage $U_e$ and the input voltage set value $U_{esoll}$ is illustrated by a block 51 in FIG. 5, which is addressed when the control device 49 of FIG. 4 is activated in a starting block 50 and has provided the corresponding set values. Further, in a second case, where the input voltage is higher than the predetermined input voltage set value, and where the input voltage is smaller than the output voltage set value, which is normally the case, since the supply voltage has a monotonously rising curve up to the voltage peak, the control device is designed to control the controllable resistor 48 of FIG. 4, such that the controllable resistor has a second lower resistance, as illustrated in a block 54. Whether the second case is present or not is determined by a decision block 53. In a second case, "closing" the controllable resistor 48 to an average resistance is effective such that a charge acceptance of the first capacitance 43 is at least reduced, and that more charge flows into the second capacitance 46 as in the case where the controllable resistor has the high resistance, which means in the first case.

Further, in a third case determined by decision block 55, which consists of the output voltage being higher or equal to the output voltage set value, the control device 49 is formed to control the controllable resistor 48, such that the same has a third low resistance, so that the first and second capacitance are connected in parallel across the third lower resistance, as illustrated in a block 56 in FIG. 5. If, as has already been discussed, a transistor $T_1$ is used as controllable resistor 48, as shown in FIG. 4, the high resistance $R_1$ of block 52 in FIG. 5 is obtained by bringing the transistor into a non-conductive way, while the low resistance $R_3$ is ensured by switching through the resistor $T_1$ by using a corresponding gate voltage. The average resistance is reached by operating the transistor in the triode region.

Figure 6A:
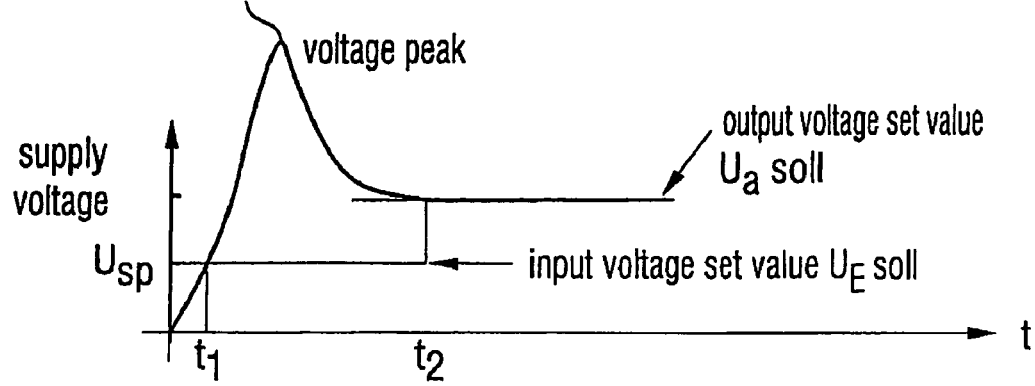
FIG. 6a is a time curve of the supply voltage with a voltage peak.
Figure 6B:
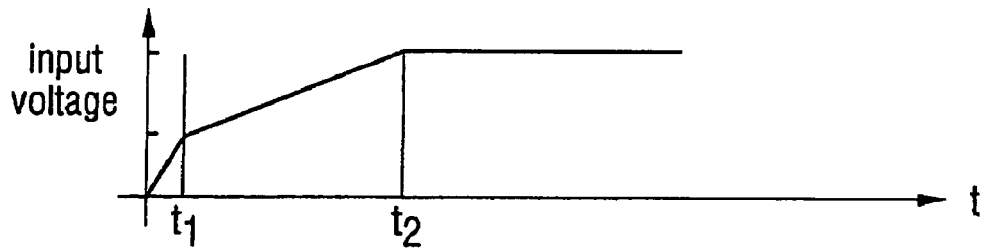
FIG. 6b is a time curve of the input voltage without voltage peak.

Below, the functionality of the circuit shown in FIG. 4 will be discussed with reference to FIGS. 6a to 6d. It should be noted that the time curves in FIGS. 6a to 6d are merely outlined to discuss the functionality of the inventive circuit. Actual switching curves can deviate strongly from the time curves shown in FIGS. 6a to 6d. In FIG. 6a, a supply voltage time curve with a voltage peak 60 is shown exemplarily. Further, in FIG. 6a, the input voltage set value $U_{esoll}$ and output voltage set value $U_{asoll}$ are shown. With reference to FIG. 6b, the input voltage follows the supply voltage in the time period between t=0 to t=$t_1$, since the resistance of the controllable resistor 48, indicated by $R_1$ in FIG. 6d, is very high. Then, at a time $t_1$, the resistance is reduced, as shown by a falling edge at 61 in FIG. 6d. This causes that charge moved due to the supply voltage no longer flows in the first capacitor 43 exclusively, but into the second capacitance 46 across the controlled resistor. This causes the output voltage at the second capacitance 46 to rise between the time $t_1$ to a time $t_2$, since more and more charge flows into the second capacitance 46. Due the opening of the controllable resistor 48 between $t_1$ and $t_2$, the input voltage does no longer rise exactly like the voltage peak, but significantly slower. With corresponding control by the control device 49, it can also be effected that the input voltage remains substantially on the input voltage set value $U_{esoll}$.

Figure 6C:
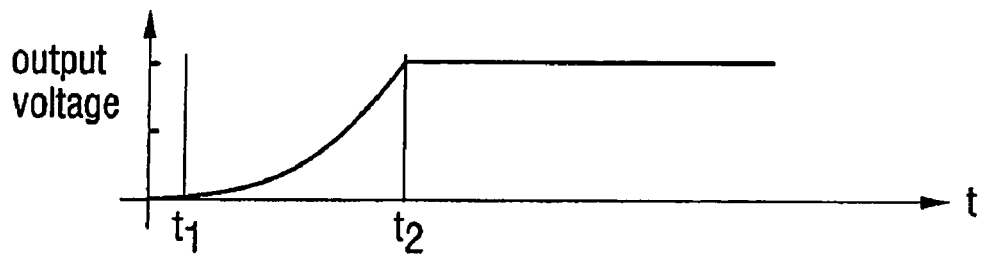
FIG. 6c is a time curve of the output voltage without voltage peak.
Figure 6D:
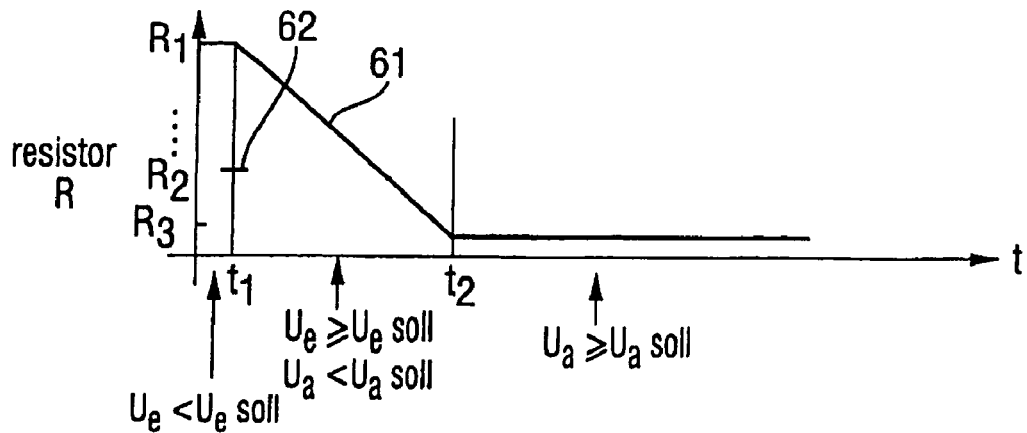
FIG. 6d is a time curve of the resistance of the controllable resistor.

In any case, it can be seen from FIGS. 6b and 6c, that the voltage peak 60 in FIG. 6a does neither breakdown to the input voltage $U_e$ nor to the output voltage $U_a$, but that the energy stored in the voltage peak 60 is fully utilized for quickly charging the normally large second capacitor 46.

Depending on the control of the controllable resistor 48, the time curves of the input voltage and the output voltage can be influenced. If the resistor is not monotonously changed to a second resistance changing across time between the time $t_1$ and the time $t_2$, but merely to a resistance 62 at a time $t_1$, where the controllable resistor would remain until the time $t_2$, this would have the effect that the input voltage slightly falls at the time $t_1$ compared to the input voltage set value, while the output voltage would jump at a time $t_1$. The input voltage would then rise again, exceed the input voltage set value and finally obtain a value predetermined by the selection of $R_2$ 62 in FIG. 6d.

According to the invention, the dimensioning of $R_2$ 62 or, when a monotonously falling resistance curve is desired, the form and steepness of edge 61 are chosen such that the input voltage preferably does not rise by more than a tolerance range of, for example, 20% below the input voltage set value, since, as will be discussed below, the input voltage $U_e$ will be used to supply the control 111 of FIGS. 1 to 3a with voltage, so that a startup process of the switching regulator shown in FIGS. 1 to 3a runs in a defined way and fast. Therefore, it is not important whether the input voltage rises in a steep or flat way between the time $t_1$ and the time $t_2$, as long as the voltage requirements of control 111, which is supplied with the input voltage $U_e$, are fulfilled. Of course, the edge 61 in FIG. 6d can also be replaced by a step function or any, for example, square or cubic continuously or step-like formed function, depending on the circumstances. It will always be ensured that the voltage peak 60 does not fully break through neither to the input voltage nor the output voltage.

Further, it is preferred to dimension the two capacitors such that they are able to take up the whole energy of the voltage peak 60. If a particularly high voltage peak with a lot of energy arrives, and the capacitors are not sufficiently dimensioned, they still achieve an attenuation of the voltage peak, although a full elimination of the voltage peak is preferred. When the inventive circuit shown in FIG. 4 is used as capacitance 102 in the switching regulator shown in FIG. 2, this is typically no problem, since the capacitance value realized by the parallel circuit of the two capacitors 43 and 46 takes on significant amounts anyway, which are easily sufficient to also "absorb" very high voltage peaks.

The circuit concept shown in FIGS. 2 and 3a is particularly problematical and can be replaced particularly well by the circuit shown in FIG. 4, since particularly with large input voltages 10, 12 in FIG. 2 or FIG. 3a, this causes that the charging current for the capacitor 102, which is equal to the current through the coil 100, is actually switched off at a time where the switch 109 is controlled during startup, in order to be connected to the positive output rail 114. In the case of FIG. 2, additionally, the small diode breakdown current within the range of 10 μA also flows through the coil 100 to ground 112 due to the fact that the Zener diode is operated in breakdown. Thus, if the switch 109 changes over during the startup process after achieving the maximally automatically settable voltage $U_{SR}$, a voltage peak will be generated due to the energy stored in coil 100, which makes the node highly negative at the time of the peak, wherein this additional difference is only balanced out in that the current from the coil charges the capacitor 102 across the diode 104, which will then be operated in flow direction. This voltage peak in $U_{SR}$ could easily destroy the control 111 when it is supplied by $U_{SR}$.

Figure 8A:
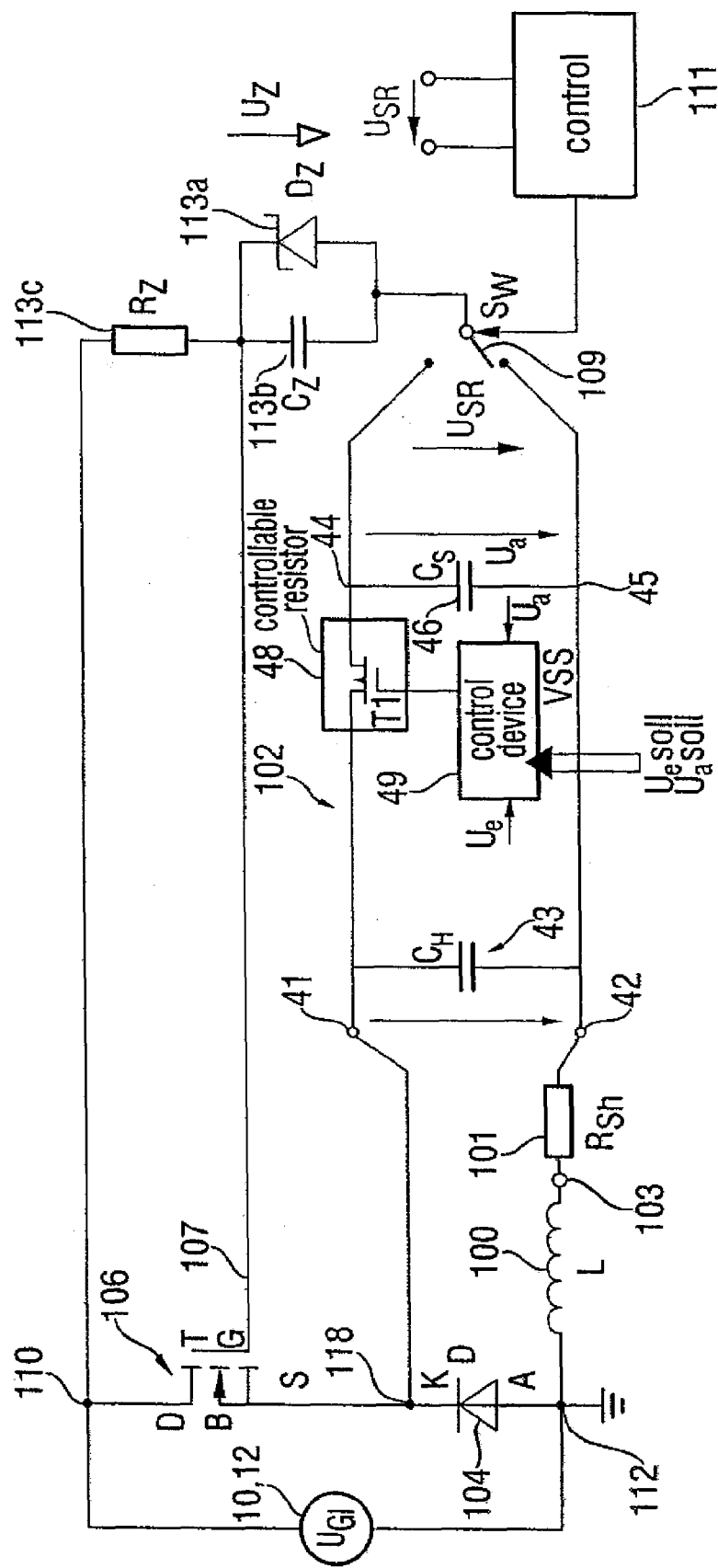
FIG. 8A illustrates a switching regulator of FIG. 2 having a circuit for processing a supply voltage with a voltage peak of FIG. 4.
Figure 8B:
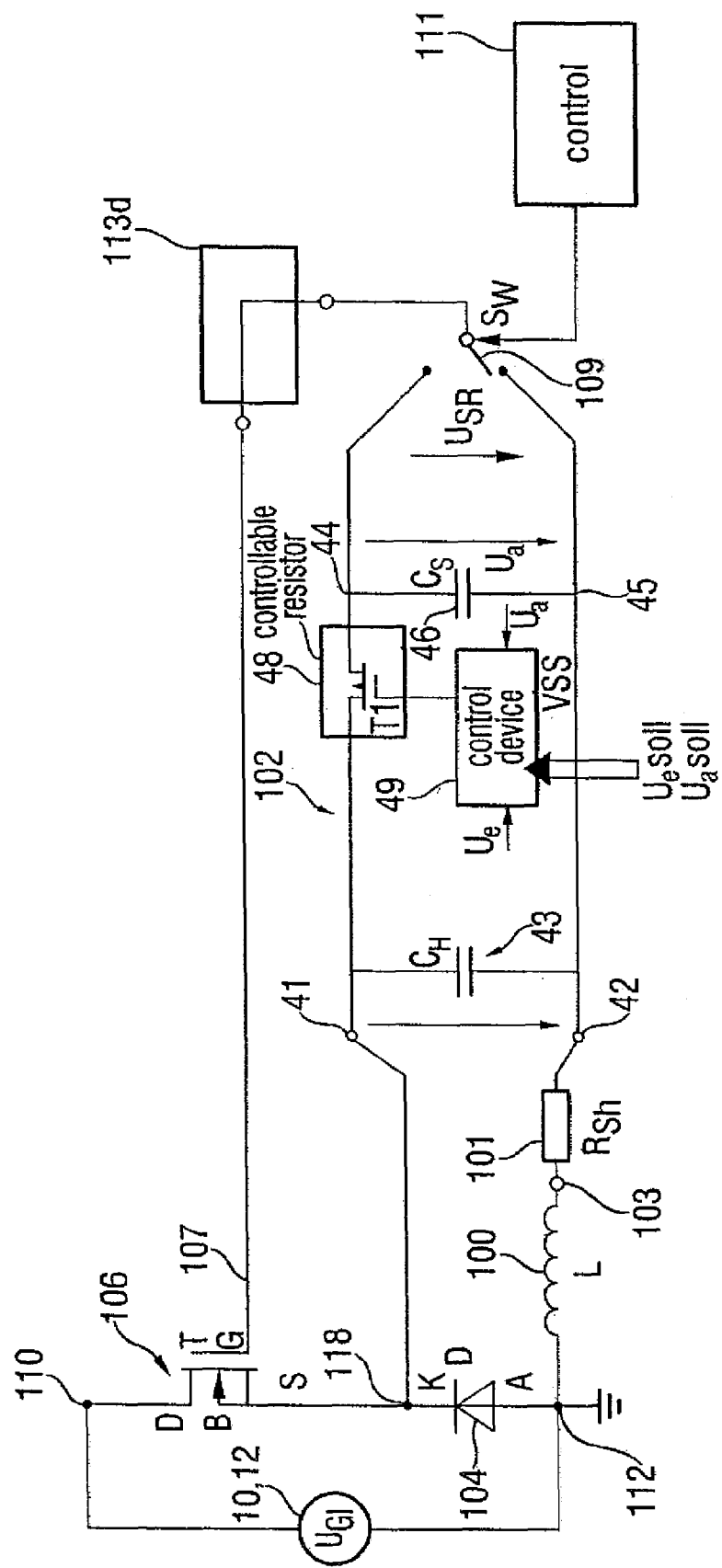
FIG. 8B illustrates a switching regulator as shown in FIG. 3A having the circuit for processing a supply voltage with a voltage peak of FIG. 4.

In order to avoid this, according to the invention, the capacitor 102 in FIGS. 2 and 3a is, replaced by the structure shown in FIG. 4 of two capacitances together with controllable resistor and control device. The resulting devices are illustrated in FIGS. 8A and 8B. The capacitor 43 is referred to as auxiliary capacitor $C_H$, while the actual filter capacitor is now referred to as C's. The transistor 48 is non-conductive as long as the voltage $U_{SR}$ is to be smaller than the output voltage $U_a$. The capacitor $C_H$ is chosen small, so that it is quickly charged to the set voltage. If its voltage $U_{SR}$ reaches the set value, which means the input voltage set value, the transistor opens and supplies the excessive energy from the inductor L to the significantly higher filter capacitor C's. If, as preferred, the circuit shown in FIG. 4 is used in a switching regulator of the configuration of FIGS. 2 and 3a, the control 111 is supplied by $U_{SR}$ (and not $U_a$), and the control 111 can be functional very fast, since the capacitor $C_H$ is chosen small. Thus, by controlling the change-over switch, it is ensured that C's is charged further until the voltage $U_a$ reaches the output voltage set value.

In the embodiment for the input voltage set value $U_e$ shown in FIG. 4, practically, a voltage value is chosen, which depends on the configuration of the control 111. It is preferably chosen such that it is at least so high that the control 111 can operate with a voltage equal to the input voltage set value. The output voltage set value will be predetermined by the general specification of the switching regulator, since a load is disposed on the output side, which "sees" the output voltage at the capacitor 46. Preferably, the transistor is first fully switched through and then used for connecting the two capacitors in parallel, when the output voltage $U_a$ is as high as the input voltage $U_e$.

As has been explained above, the first capacitor 43 will be dimensioned significantly smaller than the second capacitor 46. At the time where the controllable resistor 41 is not on the lowest resistance, a filter capacitance is effective, which is, for example, reduced compared to the specific filter capacitance 102 of FIG. 2 or FIG. 3a, which is at first, when the controllable resistor 48 has a high resistor, equal to the value of $C_H$, and then becomes higher and higher corresponding to the reduction of the resistance of the controllable resistor 48, until it is finally equal to the sum of $C_H$ and C'$_s$. In the startup process of the switching regulator, which means when the source 10 shown in FIG. 1 is switched on via the switch 14, merely the small capacitance $C_H$ operates as filter capacitance of the switching regulator. The large ripples of the output voltage actually connected to a small filter capacitance, are of no importance here, since the switching regulator is anyway only ready for supplying a load when the output voltage has the output voltage set value, wherein then the transistor $T_1$ is fully switched through and thus the two capacitances $C_H$ and $C'_s$ are connected in parallel.

However, it is an advantage that the capacitance $C_H$ quickly reaches a voltage level, where the control 111 of FIG. 2 and FIG. 3a, as shown in FIGS. 2 and 3a, will be supplied with $U_{SR}$, which means $U_e$ in FIG. 4, because the same is smaller than the capacitance $C'_s$.

As has been discussed with regard to FIGS. 2 and 3a, it is thus preferred to make the input voltage set value $U_{esoll}$ so high that the control 111 of FIG. 2 and FIG. 3a ensures during startup, when the same is operable, that the change-over switch 109 is connected to the positive output rail 113. Further, it has already been noted that this voltage level where the control 111 can operate, has to be smaller than the voltage falling at the Zener diode 113b in FIG. 2 and less than the threshold voltage of the transistor. In the embodiment shown in FIG. 3a, the voltage level where the control 111 can operate has to be higher than the threshold voltage $U_{th}$ of the transistor 106, when the control is to operate with $U_{SR}$, which means in FIG. 4 with $U_e$.

Preferably, the control device 49 in FIG. 4, which controls the controllable resistor 48, is also formed to be supplied with $U_a$. This means that the control device 49 can already operate in a defined way when its supply voltage $U_e$ or $U_{SR}$ has reached a certain value. In this embodiment, the control device 49 would be formed to immediately reduce the resistance of the controllable resistor 48, when the same operates in a defined way, since it is then inherently clear that the input voltage $U_e$ has reached an input voltage threshold.

As has been discussed above, the circuit shown in FIG. 4 is advantageous in that it limits the voltage $U_{SR}$, which means generates a voltage $U_e$ or $U_{SR}$, respectively, which has no voltage peaks, and that simultaneously charging the capacitor $C'_s$ at the output of the circuit is accelerated, in that the energy of the voltage peak is used for charging the (large) filter capacitor 46. Thus, at the same time, starting up a switching regulator having the circuit shown in FIG. 4 instead of the filter capacitor, is accelerated, since the supply voltage required for controlling the switching regulator is quickly reached and is not provided with voltage peaks.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A circuit for processing a supply voltage with a voltage peak to obtain an output voltage with reduced or eliminated voltage peaks, comprising:

a first capacitance between a first node and a second node, wherein an input voltage can be generated between the first node and the second node due to the supply voltage;

a second capacitance between a third node and a fourth node, wherein the output voltage can be tapped between the third node and the fourth node, wherein the first capacitance has a smaller capacitance value than the second capacitance;

a controllable resistor between the first node and the third node; and a control device for controlling the controllable resistor, wherein the control device is formed to control the controllable resistor in a first case, where the input voltage is smaller than a predetermined input voltage set value, such that the controllable resistor has a first high resistance, to control the controllable resistor in a second case, where the input voltage is equal to or higher than the predetermined input voltage set value, and where the output voltage is smaller than a predetermined output voltage set value such that the controllable resistor has a second, lower resistance, so that a charge acceptance of the first capacitance is at least reduced and more charge flows into the second capacitance than in the case where the controllable resistor has the high resistance, and to control the controllable resistor in a third case, where the output voltage at the second capacitance is equal to or higher than the predetermined output voltage set value, such that the same has a third low resistance so that the first capacitance and the second capacitance are substantially connected in parallel, wherein the first resistance is higher than the second resistance, and wherein the second resistance is higher than the third resistance.

2. The circuit according to claim 1, wherein the first resistance substantially represents an open and the third resistance substantially represents a short.

3. The circuit according to claim 1, wherein the control device is formed to reduce, in the second case, the second resistance monotonously falling from the first resistance to the third resistance.

4. The circuit according to claim 1, wherein the control device is formed to reduce, in the second case, the second resistance monotonously falling such that the input voltage does not move out of a tolerance range extending around the predetermined input voltage set value.

5. The circuit according to claim 4, wherein the tolerance range is chosen such that the same extends plus or minus 20% around the predetermined input voltage set value.

6. The circuit according to claim 1, wherein the first capacitance is dimensioned such that it is smaller than a limiting capacitance, which determines an upper limit for a time period how quickly the input voltage reaches the predetermined input voltage set value, when a supply voltage with a predetermined rising steepness is assumed.

7. The circuit according to claim 1, wherein the first capacitance is dimensioned such that it has a capacitance, which is at least so high that a predetermined amount of charge is stored on the first capacitance at the predetermined input voltage set value.

8. The circuit according to claim 7, wherein the predetermined amount of charge is so high that the control device for controlling the resistance or a control for regulating the input voltage is operable through the input voltage.

9. The circuit according to claim 1, wherein the second capacitance is at least so high that it can store a charge, which is driven into the first node due to a voltage peak of the supply voltage, without the output voltage generating a tolerance range around the predetermined output voltage set value.

10. The circuit according to claim 9, wherein the tolerance range extends to plus minus 20% around the predetermined output voltage set value.

11. The circuit according to claim 1, wherein the predetermined output voltage set value is equal to the predetermined input voltage set value.

12. The circuit according to claim 1, wherein the predetermined input and output set values are stored in the control device, and wherein the control device is formed to compare the input voltage to the stored predetermined input voltage set value and to compare the output voltage to the stored predetermined output voltage set value, for determining whether the first, second or third case is present.

13. The circuit according to claim 1, wherein the control device is formed to transit from the first case to the second case at one time based on a time state sequence, and to transit from the second case to the third case at a later time, wherein a time period between the second time and the first time is programmed into the control device.

14. A method for processing a supply voltage with a voltage peak for obtaining an output voltage with reduced or eliminated voltage peaks, comprising the steps of:
charging a first capacitance between a first node and a second node, wherein an input voltage is generated between the first node and the second node due to the supply voltage;
charging a second capacitance between a third node and a fourth node, wherein the output voltage is generated between the third node and the fourth node, wherein the first capacitance has a smaller capacitance value than the second capacitance;
controlling a resistor between the first node and the third node, such
that in a first case, where the input voltage is smaller than a predetermined input voltage set value, the controllable resistor has a first high resistance,
that in a second case, where the input voltage is equal to or higher than the predetermined input voltage set value, and where the output voltage is smaller than a predetermined output voltage set values, the controllable resistor has a second lower resistance, so that charging the first capacitance is at least reduced, and that charging the second capacitance is increased compared to the case where the controllable resistor has the high resistance, and
that in a third case, where the output voltage at the second capacitor is equal to or higher than the predetermined output voltage set value, the controllable resistor has a third lower resistance, so that the first capacitance and the second capacitance are substantially connected in parallel,
wherein the first resistance is higher than the second resistance, and
wherein the second resistance is higher than the third resistance.

15. A switching regulator for generating a regulated switching regulator output voltage by using an input voltage, comprising:
a controllable switch;
a network with a diode, an inductance and a filter device;
a switching regulator control for regulating the output voltage by periodically operating the controllable switch to regulate the output voltage, and
wherein the filter device comprises a circuit for processing a supply voltage with a voltage peak to obtain an output voltage with reduced or eliminated voltage peaks, comprising:
a first capacitance between a first node and a second node, wherein an input voltage can be generated between the first node and the second node due to the supply voltage;
a second capacitance between a third node and a fourth node, wherein the output voltage can be tapped between the third node and the fourth node, wherein the first capacitance has a smaller capacitance value than the second capacitance;
a controllable resistor between the first node and the third node; and
a control device for controlling the controllable resistor, wherein the control device is formed
to control the controllable resistor in a first case, where the input voltage is smaller than a predetermined input voltage set value, such that the controllable resistor has a first high resistance,
to control the controllable resistor in a second case, where the input voltage is equal to or higher than the predetermined input voltage set value, and where the output voltage is smaller than a predetermined output voltage set value such that the controllable resistor has a second, lower resistance, so that a charge acceptance of the first capacitance is at least reduced and more charge flows into the second capacitance than in the case where the controllable resistor has the high resistance, and
to control the controllable resistor in a third case, where the output voltage at the second capacitance is equal to or higher than a predetermined output voltage set value, such that the same has a third low resistance so that the first capacitance and the second capacitance are substantially connected in parallel,
wherein the first resistance is higher than the second resistance, and wherein the second resistance is higher than the third resistance.

16. The switching regulator according to claim 15, wherein the supply voltage can be provided to the first capacitance from a supply voltage generator, wherein the supply voltage generator comprises the coil and the diode of the network, and wherein the voltage at the second capacitor represents the output voltage of the switching regulator.

17. The switching regulator according to claim 15, wherein the switching regulator control is formed to control the controllable switch based on the input voltage at the first capacitance after switching on the switching regulator input voltage.

18. The switching regulator according to claim 15, wherein the switching regulator control device can be supplied by the input voltage at the first capacitance.

19. The switching regulator according to claim 15, wherein the switching regulator control is formed to control a change-over switch, wherein the change-over switch is connected to a voltage coupling device to either couple a potential at a positive output rail or a potential at a negative output rail to a control input of the controllable switch,
wherein the controllable switch is formed as transistor, and
wherein the control input of the controllable switch is a gate of the transistor.

* * * * *